United States Patent [19]
Jensen et al.

[11] Patent Number: 5,463,957
[45] Date of Patent: Nov. 7, 1995

[54] INFLATABLE NOSE FAIRING

[75] Inventors: Duane L. Jensen, Byron; Rolla W. Allen, Santa Clara, both of Calif.

[73] Assignee: Lockheed Missiles & Space Company, Inc., Sunnyvale, Calif.

[21] Appl. No.: 249,847

[22] Filed: May 26, 1994

[51] Int. Cl.⁶ .................................................. F42B 15/01
[52] U.S. Cl. ........................................... 102/293; 244/3.1
[58] Field of Search ............................. 89/1.80, 1.809, 89/1.816, 1.817; 102/293, 490; 244/3.1, 160; 114/20.1

[56] References Cited

U.S. PATENT DOCUMENTS

| | | | |
|---|---|---|---|
| 3,053,488 | 9/1962 | Cox | 244/130 |
| 4,166,597 | 9/1979 | Seifert et al. | 244/160 |
| 4,181,079 | 1/1980 | Klier et al. | 102/476 |
| 4,549,464 | 10/1985 | Hawkins et al. | 89/1.809 |
| 4,770,369 | 9/1988 | Flock et al. | 244/3.1 |
| 4,921,557 | 5/1990 | Nakamura | 156/169 |

*Primary Examiner*—Charles T. Jordan
*Assistant Examiner*—Theresa M. Wesson
*Attorney, Agent, or Firm*—Feix & Feix; H. Donald Volk

[57] ABSTRACT

A flexible, aerodynamic inflatable nose fairing for use in combination with flat nosed canister launched missiles having a wide circular cylindrical shape. The inflatable nose fairing is fabricated as a fiber-reinforced elastomeric membrane having a laminate construction which includes a silicone rubber inner or base layer as the gaseous pressure membrane or bladder, surrounded by two or more ply layers made up of resin-impregnated yarns. In a preferred embodiment, the silicone rubber bladder is applied to a generally conical shaped mandrel. The first ply layer is fabricated by hoop winding resin impregnated yarns on a constant diameter cylinder and then cutting to form gores. The gores are applied to the conical shaped mandrel such that the gore fibers are oriented in the axial direction of the conical shaped mandrel. A second ply layer of resin-impregnated yarns is applied circumferentially over the first ply layer by hoop winding such that the fibers of the second ply layer are oriented transverse to the fibers of the first ply layer. The second ply layer is roughly twice the thickness of the first ply layer. The unbalanced ply stacking facilitates bending in the axial direction and allows the nose fairing to be compactly folded into a shallow stowed position which, in turn, allows for an increase in the payload capacity of the missile. An outer protective layer may be applied to the outer structural ply layer to provide thermal and erosion protection.

8 Claims, 11 Drawing Sheets

FIG_1A PRIOR ART

FIG_1B PRIOR ART

FIG_3A

FIG_3B

FIG_2

EXISTING MISSILE

FIG_5

INFLATABLE NOSE FARING DESIGN

FIG_6

FIG_4

FIG_7

FIG_8

FIG_9A

FIG_9B

FIG_9C

FIG_10

FIG_10A

FIG_11

FIG_12

CONVENTIONAL BALANCE PLY STACKING

GORES — HOOPS

STIFF LAMINATE

FIG_13

PRIMARY STRUCTURE
GORES
INNER
UNIQUE UNBALANCED PLY STACKING
HOOPS
OUTER PROTECTIVE LAYER

FIG_13A

PRIMARY STRUCTURE
GORES
INNER
UNIQUE UNBALANCED PLY STACKING
HOOPS
OUTER PROTECTIVE LAYER

FIG_13B

EASIER TO FLEX IN ONE DIRECTION

FIG_14

FIG_15

FIG_16

FIG_16A

FIG_16B

FIG_16C

FIG_18

FIG_17

FIG_22

FIG_23

FIG_21

1
INFLATABLE NOSE FAIRING

TECHNICAL FIELD

This invention relates to improvements in aerodynamic structures for use in length-constrained propulsion systems, such as for example, canister-launched missiles. More particularly, this invention relates to a flexible and compactly stowable fiber-reinforced composite inflatable nose fairing construction for a canister launched missile and a method of fabricating the same.

BACKGROUND OF THE INVENTION

As Fleet Ballistic Missiles (FBMs) have increased in length and diameter to meet greater range and payload requirements, the nose fairing has become blunter for efficient use of the launch-canister volume. The blunt nose has increased drag, resulting in a range penalty. One technique for increasing range is by deploying an aerospike from the nose fairing of the missile. The aerospike creates a region of flow separation over the nose fairing thereby reducing dynamic pressures within this region which results in reduced drag for the missile. However, the aerospike also forms a shock wave at the nose fairing surface that limits its full range-gaining potential.

U.S. Pat. No. 4,549,464 issued to Hawkins et al. proposes one solution for eliminating the shock wave caused by the deployable aerospike while still maintaining the increased payload capacity benefit of a blunt nose missile. This patent document discloses an inflatable aerodynamic shroud which attaches to the blunt nose cone of the missile. In its stowed position within the launch canister, the shroud is folded flush against the forward surface of the blunt nose cone. Once launched, the shroud is inflated into an aerodynamic deployed position by actuation of a solid propellant gas generator.

As compared to a deployable aerospike-equipped missile having a rigid nose fairing, the inflatable aerodynamic shroud of Hawkins et al. allows for an increase in the cylindrical body portion of the missile thereby providing increased fuel and payload capacity and improved range gaining potential for the missile. A blunt nose cone, however, is not optimum for the efficient packaging of payload elements. Also, it would be desirable to utilize the unoccupied space in the launch canister surrounding the blunt nose cone for further increasing the fuel and payload capacity of the missile.

A desirable feature of an inflatable nose fairing is that it exhibit good flexibility in order to provide compact folding capability into a stowed position so that the missile can be lengthened and yet still fit within a launch canister.

The structure must also be air tight to permit reliable and rapid inflation and have a high tensile strength characteristic sufficient to withstand the dynamic pressures of flight when deployed. Further, the structure must be able to withstand the elevated temperatures which are encountered while traveling at transonic and supersonic velocities. Further still, the nose fairing must be able to withstand the effects of erosion caused by debris, sandstorms, iceclouds, etc.

U.S. Pat. No. 4,921,557 issued to Nakamura discloses a method of fabricating a conically shaped fiber-reinforced elastomeric membrane suitable for use as an inflatable nose fairing for a blunt nose cone of a submarine-launched missile. The elastomeric membrane includes three ply layers of silicone rubber impregnated yarns. The yarns of the first and third ply layers are oriented circumferentially, being applied on a conical mandrel using a helical winding apparatus. The second ply is fabricated by hoop winding silicone rubber impregnated yarns on a constant diameter cylinder and then cutting to form gores of fiber-reinforced rubber material. The gores are then applied to the conical mandrel so that the yarns of the second ply are oriented transverse to the yarns of the first (and third) ply(s). The resulting laminate is a balanced ply construction consisting of a longitudinal ply layer sandwiched between two circumferential or hoop wound ply layers.

Generally speaking, for laminate structures, the thicker the laminate, the less flexible the completed structure will become. In view of the balanced ply construction of Nakamura, there is a limitation as to how thick the ply layers can be made to ensure good flexibility for compact folding of the inflatable nose fairing into the stowed position and still satisfy the thermal, strength and erosion resistance requirements for specific applications. Also, the geometry of a balanced ply construction as disclosed in Nakamura will inherently exhibit high bending stiffness in the longitudinal or axial direction of the nose fairing as the longitudinally arranged fibers of the second ply layer, being located at a distance away from a neutral axis of the cross section through the axial direction of the laminate, are in relatively high strain.

Accordingly, there is a definite need in the art for an improved inflatable nose fairing construction and method of fabrication which overcomes the problems of the prior art.

SUMMARY OF THE INVENTION

It is therefore an object of the invention to provide an inflatable nose fairing for a length-constrained missile of the type launched from canisters or from internal weapons bay of aircraft which allows for a greater increase in the payload capability of the missile than previously obtainable in the prior art and, when inflated, provides a desired aerodynamic shape for reducing drag and increase range.

It is a related object of the invention to provide a flexible and compactly foldable inflatable nose fairing for use in combination with a length-constrained canister launched missile having a wide circular cylindrical shape and flat nose for increased payload capacity as compared to conventional blunt nose length-constrained canister launched missiles.

It is another object to provide a method for fabricating an inflatable nose fairing of the type described which includes a primary structure formed as a fiber-reinforced elastomeric membrane having an unbalanced ply layer construction and which exhibits increased flexibility in one direction to allow for compact folding into the stowed position and thereby permit an increase in the length and width of the forward end of the missile body for greater payload capacity.

It is another object of the invention to provide a fabrication method of the type described which includes providing a sacrificial outer layer of material for surrounding the primary structure to provide thermal insulation and protection against erosion caused by debris, sandstorms, ice clouds and the like.

Methods and apparatus which incorporate the features described below and which are effective to function as described above constitute specific objects of this invention.

The inflatable nose fairing of the present invention represents a unique apparatus and method of obtaining additional volume where the missile's length is constrained such as with canister launched missiles or missiles launched from the internal weapons bay of aircraft. An idealized missile shape which would maximum the volume within a launch canister is a wide cylinder of constant circular diameter from rearward end to forward end. However, the drag penalties for such a flat nosed missile configuration would be severe.

Accordingly, the invention proposes to provide an inflatable nose fairing which attaches to a pressure bulkhead at the forward, flat end, of a uniformly wide cylindrical missile body. The inflatable nose fairing is sufficiently flexible to allow for compact folding into a stowed position to fit within a low volume disk shaped region at the flat nose end of the missile.

The inflatable nose fairing comprises a primary structure fabricated as a fiber-reinforced elastomeric membrane. The primary structure includes an inner or base layer of silicone rubber or equivalent elastomeric material which forms the pressure membrane or bladder. The inner layer is surrounded by two or more ply layers made up of resin impregnated yarns. In a preferred embodiment, the silicone rubber bladder is applied to a mandrel of generally conical or similar aerodynamic shape. The first ply layer is fabricated in three steps. The first step includes hoop winding the resin impregnated yarns on a constant diameter cylinder. The second step involves cutting to form gores of the resin impregnated hoop wound yarns. Next, the gores are applied to the generally conical shaped mandrel so that the fiber orientation of the gores are arranged generally in the axial direction of the generally conical shaped mandrel. The resin impregnated yarns of the second ply layer are applied directly over the first ply layer by steep helical hoop winding such the fibers of the second ply layer are transverse to the longitudinal or axial oriented fibers of the first ply layer.

It is an advantageous feature of the invention that the unbalanced ply stacking of the primary structure results in the axially oriented strands being located close to or at the neutral axis of a cross section through the axial direction of the resulting laminate so as to facilitate bending of the inflatable nose fairing in the axial direction. Indeed, the inflatable nose fairing is capable of being compactly folded along a number of closely spaced concentric fold lines to fit within a shallow disk shaped volume at the forward end of the flat nose missile, thereby permitting the length and payload capacity of the missile to be increased as compared to a conventional blunt nose canister launched missile.

An outer protective material layer may be applied to the primary structure to provide thermal insulation and protection against erosion causing elements. In the first embodiment, the outer protective layer comprises a rubber-based material which forms a hard char during flight at elevated temperatures.

In a second embodiment, the outer protective layer includes an additional hoop wound layer of resin impregnated yarns. This additional layer of hoop wound resin impregnated yarns function as sacrificial plies which peel off gradually during flight. Preferably the sacrificial plies are applied in sufficient thicknesses for each particular flight application to insure adequate thermal and erosion protection of the primary structure over the entire range of the flight.

The inflatable nose fairing technology can be used on a wide range of applications, from very small to very large missiles and from slow, loitering types to high velocity missiles.

Other and further objects and advantages of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE PREFERRED EMBODIMENTS

Figure 1A:
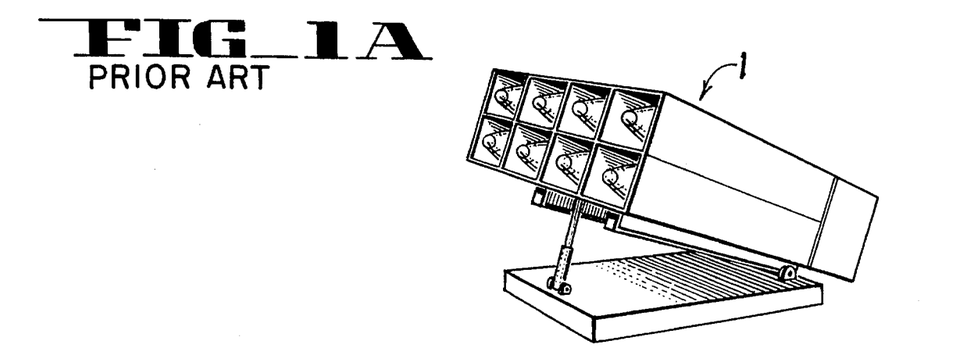
FIG. 1A is an isometric perspective view of a length-constrained canister launch missile assembly.

The inflatable nose fairing of the present invention is provided for use in combination with length-constrained missiles which are launched from fixed length launch canisters. A fixed length ground based missile launcher assembly 1 is shown in FIG. 1A. Other examples of length-constrained canisters are found in submarines or are contained within the internal weapons bay of aircraft.

Figure 1B:
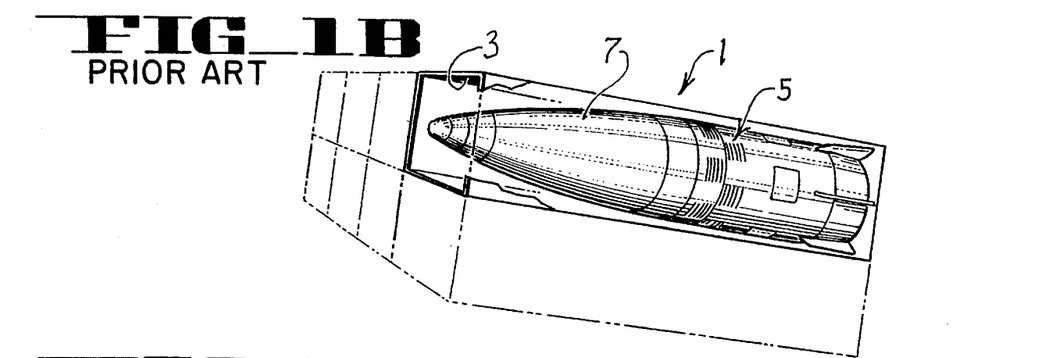
FIG. 1B shows a close up view of one length-constrained launch canister of FIG. 1A having contained therein a prior art rigid nose fairing-equipped missile.

FIG. 1B is an enlarged view of one canister 3 of the missile launcher assembly 1 showing contained therein a missile 5 having a rigid nose fairing 7.

Figure 2:
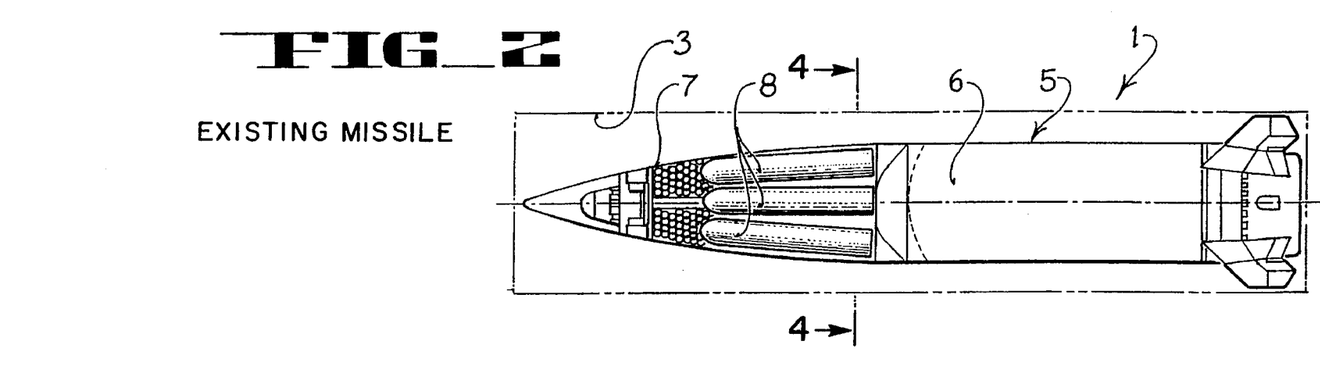
FIG. 2 is a schematic view in side elevation illustrating the limited payload capacity of the prior art rigid nose fairing-equipped missile of FIG. 1B.

FIG. 2 is a schematic side elevation view in partial cross section of the missile 5 of FIG. 1B. In this design, the cylindrical length portion of the missile 5 contains a fuel section 6 and the rigid nose fairing 7 contains payload elements 8 which surround a central tower containing onboard electronics (not shown). As is readily apparent from the drawing, the fixed general conical shape of the rigid nose fairing 7 prevents space within the launch canister 3 from being fully utilized thus limiting the payload and fuel capacity of the missile. This is also the case with blunt nose missiles although to a lesser extent.

Figures 4, 5, 6:
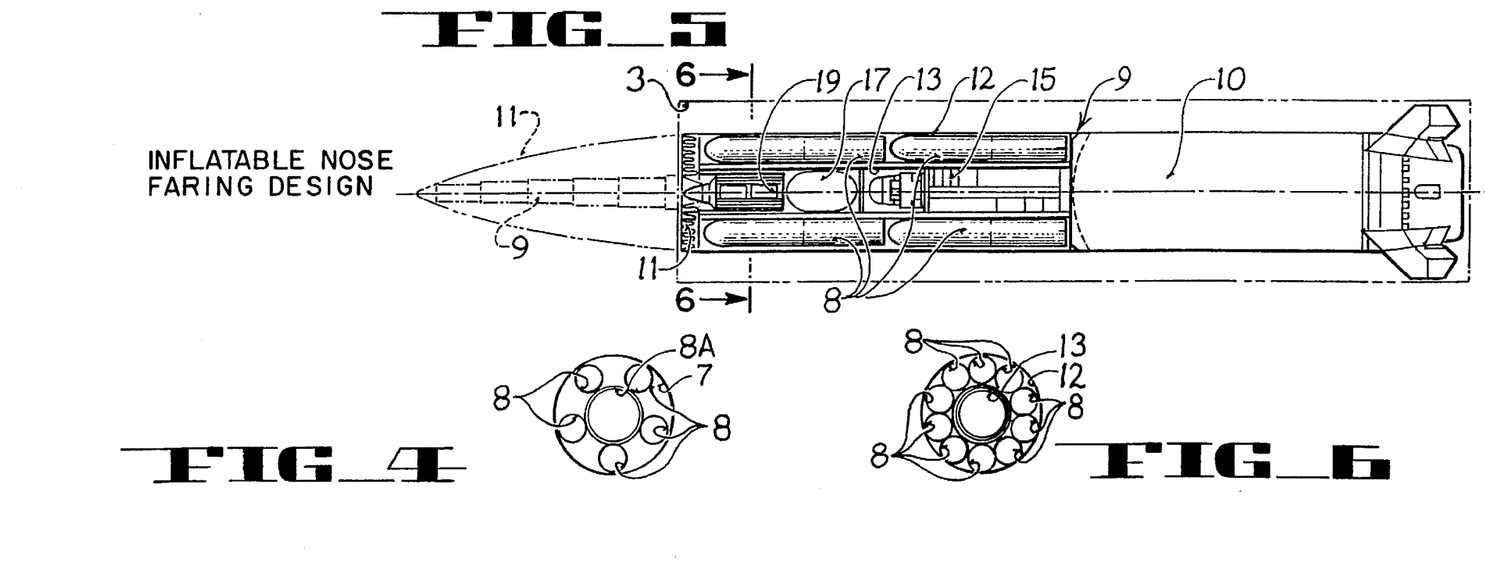
FIG. 4 is section view taken along the line and in the direction of arrows 4—4 of FIG. 2.
FIG. 5 is a schematic view in side elevation illustrating the increased payload capacity afforded by the inflatable nose fairing of the present invention when used in combination with a flat nose wide circular cylindrical missile.
FIG. 6 is section view taken along the line and in the direction of arrows 6—6 of FIG. 5.

Referring now to FIG. 4, a cross section view through the rigid nose fairing 7 is shown. Note that there is unused space between the adjacent payload elements 8 which is present since the payload element must be angled inwardly towards the central tower 8a in order to fit within the confines of the inner curvature of the rigid nose fairing 7.

Figure 3A:
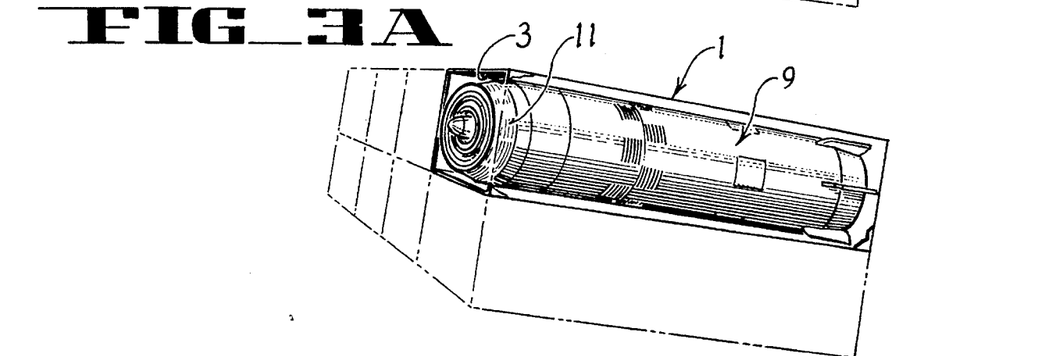
FIG. 3A is a view of a length-constrained launch canister having contained therein a flat nose missile of wide circular cylindrical shape shown equipped with an inflatable nose fairing of the present invention.

FIG. 3A is a view of a length-constrained launch canister 3 similar to FIG. 1B but shows contained therein a larger volume flat nose missile 9 equipped within a novel inflatable nose fairing 11 constructed in accordance with one embodiment of the present invention. The inflatable nose fairing 11 (shown in its stowed folded position) allows the missile 9 to have an idealized shape of a wide circular cylinder in order to maximize the volume within the launch canister 3.

Figure 3B:
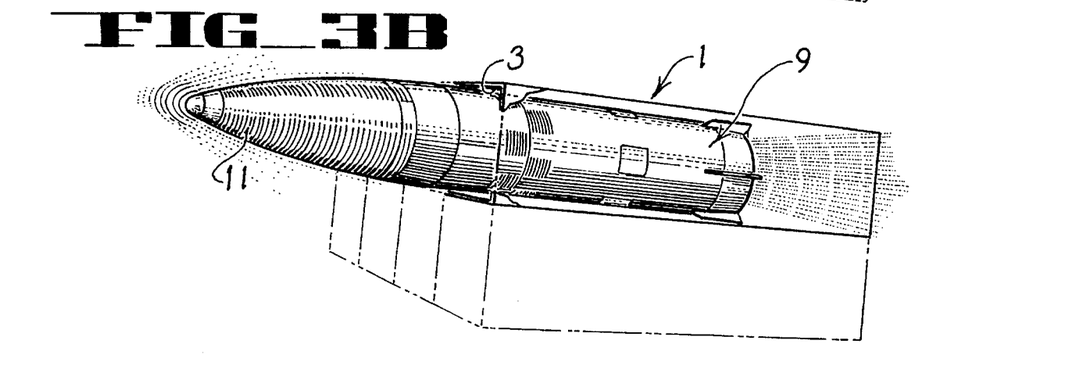
FIG. 3B shows the inflatable nose fairing of the present invention in the deployed position.

FIG. 3B shows a view of the missile 9 as it is leaving the launch canister 3 wherein the inflatable nose fairing 11 has been deployed.

FIG. 5 is a schematic side elevation view of the missile 9 contained within the launch canister 3 similar to FIG. 3. The missile 9 includes a fuel section 10 and a payload section 12. The inflatable nose fairing 11 of the present invention is shown compactly folded in the stowed position against the forward end of the payload section 12. Again, the deployed position of the inflatable nose fairing 11 is shown in phantom.

The payload section 12 includes payload elements 8 arranged in cylindrical fashion such that they surround the axial tower 13. Axial tower 13 as shown contains the missile's electronics packages 15 and a pressurized gas system 17. The pressurized gas system 17 preferrably includes one or more pressurized gas containers coupled with gas delivery means and pressure relief means to compensate for altitude pressure changes and thermal environmental changes. An optional deployable mass assembly 19 may also be contained within the axial tower 13. Since the deployed inflatable nose fairing will extend beyond the missile's constrained length when deployed, the additional length may cause the missile's center of pressure to shift forward during flight. The deployable mass assembly 19 is therefore preferably weighted to provide tailored missile control by moving the missile's center of gravity forward to offset the forward movement of the missile's center of pressure. This allows current missiles to use their existing fins and actuators to maintain acceptable stability margins.

FIG. 6 is a cross section view of the payload section of the inflatable nose fairing equipped missile of the present invention. Note that as compared to the rigid nose fairing missile design of the prior art (see e.g. FIGS. 2, 4), the inflatable nose fairing 11 of the present invention allows the payload section 12 to be enlarged from a generally conical volume to a full cylindrical volume which, in turn, allows for an increase in the packing density of the payload elements 8 around the central tower 13. Further, the added length afforded by the compactly foldable inflatable nose fairing provides room for a second round of payload elements 8.

Figure 7:
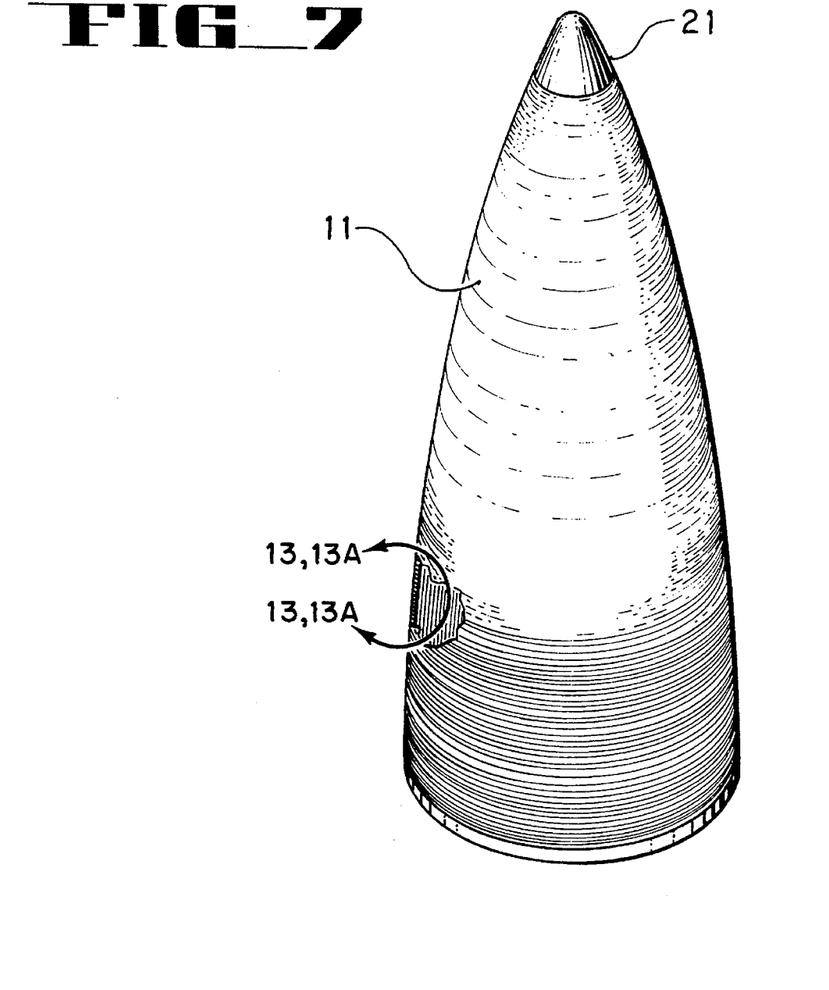
FIG. 7 is an enlarged isometric perspective view of the inflatable nose fairing of the present invention shown in a deployed position.
Figure 8:
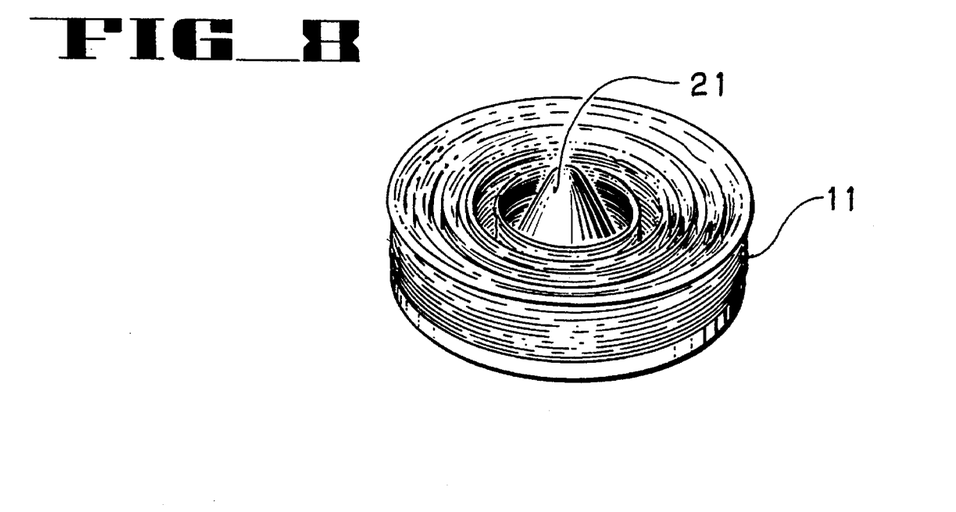
FIG. 8 is an enlarged isometric perspective view of the inflatable nose fairing of the present invention shown in a deployed position.
Figure 9A:
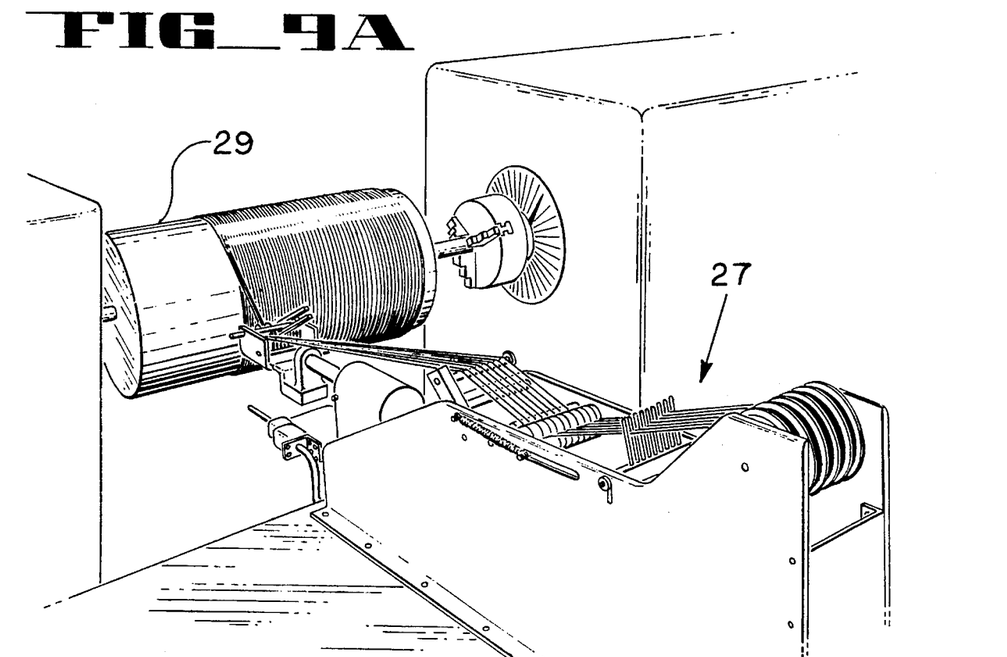
FIGS. 9A–9C, 10 is a series of isometric perspective views which illustrate the steps involved in the fabrication of the first ply layer.
Figure 9B:
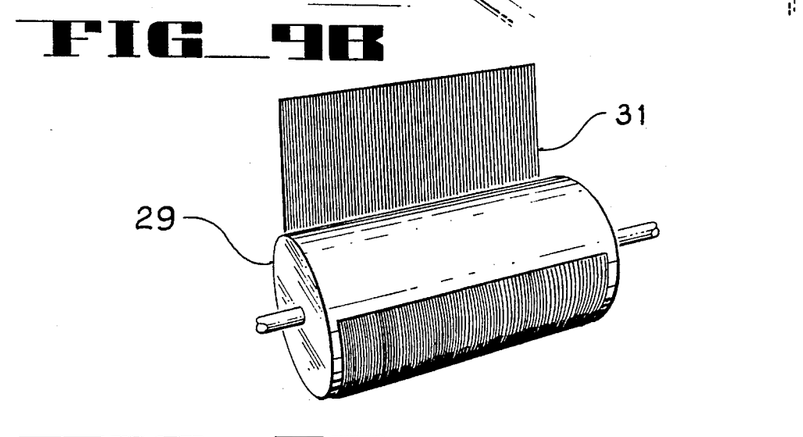
Figure 9C:
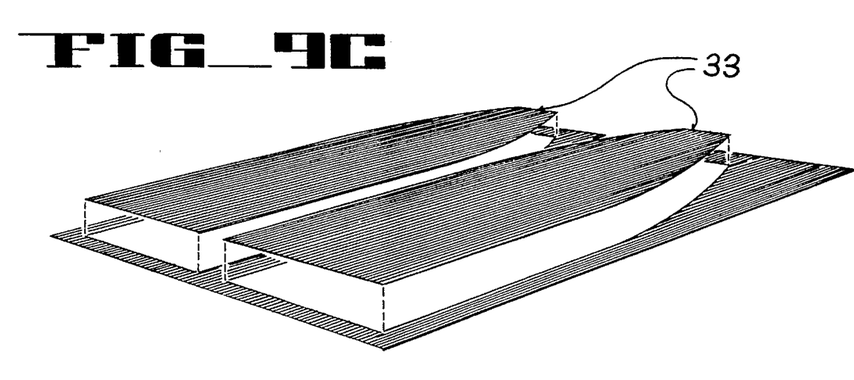

FIGS. 7 and 8 illustrate in greater detail the aerodynamically shaped inflatable nose fairing 11 of the present invention. FIG. 7 shows the inflatable nose fairing 11 in the deployed position. FIG. 8 shows the inflatable nose fairing 11 in the concentrically folded stowed position. The inflatable nose fairing 11 comprises an aerodynamic or generally conical shaped primary structure constructed as a composite of elastomeric material and resin impregnated fibers. The selected materials of construction are assembled as a filament wound laminate which exhibits minimal property degradation at elevated temperatures and low susceptibility to fiber damage. The inflatable nose fairing includes a rigid nose tip 21.

In accordance with one advantageous feature of the invention, the ordered arrangement of the individual ply layers of the laminate exhibits improved flexibility over prior art designs so that the inflatable nose fairing is capable of being compactly folded in concentric circles about a central axis to fit within a shallow planar disc shaped volume of reduced height. This is shown inn FIG. 8.

Figure 10:
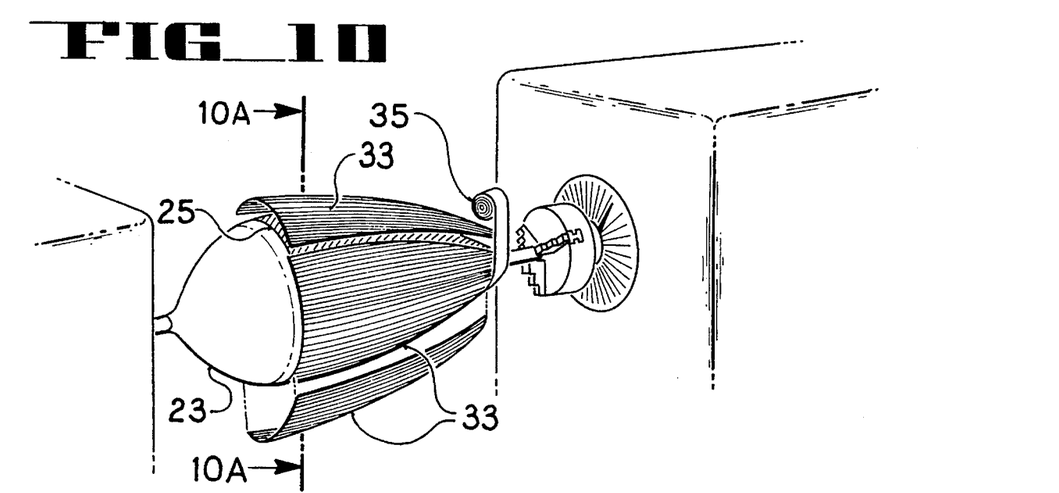

FIGS. 9A–9C, 10, 10A and 11 illustrate the fabrication process of the present invention. The fabrication process involves alternately spreading layers of elastomeric material and winding filament yarns impregnated with elastomeric material on a mandrel of the desired configuration. In this case, the primary structure is built up on a generally conical shaped mandrel 23 (see eg. FIG. 10).

Selection of a suitable elastomeric material entails evaluation of the following characteristics: viscosity, tear strength, shear strength, tensile strength, modulus, cured stiffness and thermal properties. A suitable elastomeric material for the inflatable nose fairing is the silicone rubber composition sold by Dow Corning under the trademark SYLGARD® 184 RESIN.

Suitable yarns for use as the reinforcement filaments include carbon or graphite filaments, quartz yarns, fiberglass and high modulus organic filaments of aramids and the like. Preferred yarns include the family of high thermal quartz yarns known by the trademark ASTROQUARTZ® available through J.P. Stevens and also the less expensive fiberglass family of yarns. Especially suitable: for the inflatable nose fairing is the fiberglass yarn marketed by the Owens Corning Fiberglass Corporation under the trademark S2 GLASS®.

The impregnation of yarn with the elastomeric material, in this case silicone rubber, includes spreading the yarn into fibers and encapsulating the fibers in a resin formed of the silicone rubber. Complete encapsulation of the fibers is desirable as it increases the effective shear area and thus the shear capability of the filament wound laminate. In order to function as a liquid in a resin bath to impregnate the yarns, the silicone rubber is diluted with a solvent. A dilution of about 50% by weight is generally satisfactory to achieve low volatiles and provide slow flash off of the solvent during curing of the rubber compound.

The first step in the fabrication process is to coat the mandrel 23 with a release agent to provide for the removal of the completed part from the mandrel 23. Suitable release agents include, for example, industrial release agents, hand soap, or hair spray.

Next, a thin coating of elastomeric material, preferably the same or similar silicone rubber composition as is used for impregnating the yarns, is applied to the mandrel as a base or inner layer to form a gaseous pressure membrane 25.

Next, the first and second ply layers of filament wound resin impregnated yarns are applied to the conical mandrel 23.

A filament winding apparatus 27 is used for paying out yarns from a spool under controlled tension. The filament winding apparatus preferably includes means for spreading and directing the dry fibers through a resin bath and means for removing excess resin or otherwise controlling resin pick up. Such an apparatus and its method of winding operation for fabricating a fiber-reinforced elastomeric membrane for providing and inflatable nose fairing is known, for example, from U.S. Pat. No. 4,921,557.

The first ply layer consists of generally longitudinally oriented fibers (i.e. oriented in the axial direction of the conical mandrel 23) and is formed in two steps. First, the resin impregnated yarns are hoop wound onto a constant diameter cylinder 29 using a steep helical or circumferential winding technique (see FIG. 9A). The resulting unidirectional fiber-reinforced elastomeric sheet material 31 is then removed from the constant diameter cylinder 29 (see FIG. 9B) and cut into gores (see FIG. 9C). The gores 33 are then applied to the conical mandrel 23 with a slight overlap at adjoining edges. This is shown in FIG. 10. The gores 33 are preferably held in place by tape 35 or by other means such as, for example, a single helically wound strand.

Figure 10A:
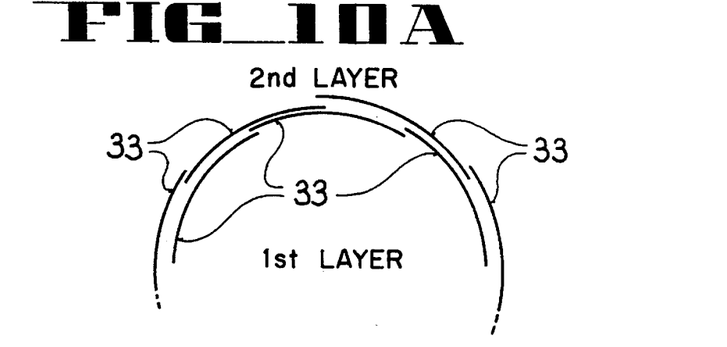
FIG. 10A is a section view taken along the line and in the direction of arrows 10A—10A of FIG. 10.

As is best seen in FIG. 10A, a second layer of gores 33 may also be applied in offsetting fashion relative to the first layer of gores 33 to provide additional reinforcement to buttress the force of the internal inflation pressure exerted on the pressure membrane 25 during deployment of the nose fairing. This is especially critical near the nose tip where the longitudinally oriented fibers are shortest in length.

Figure 11:
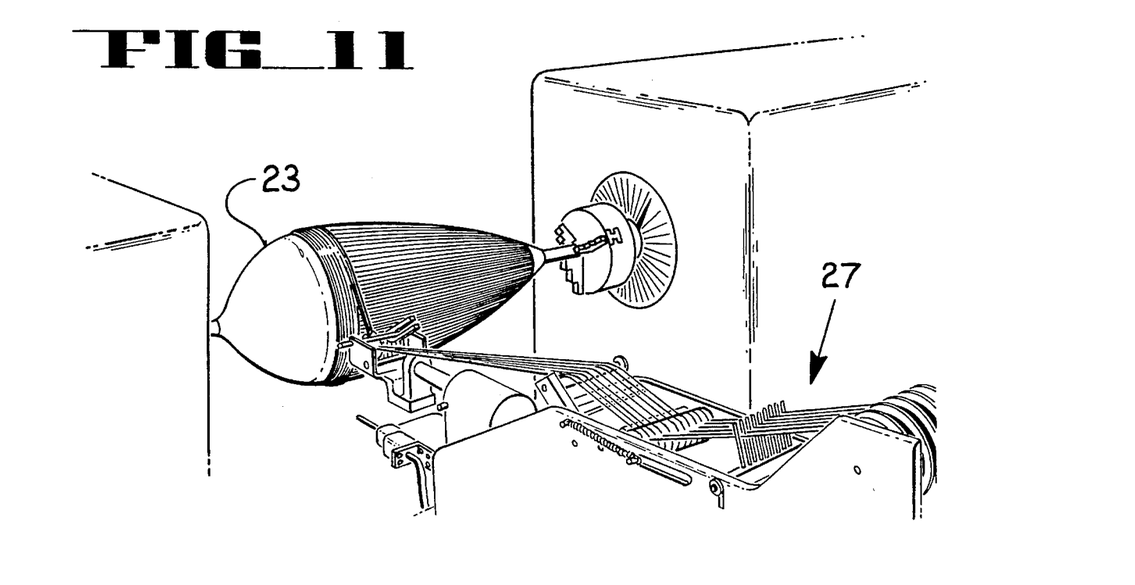
FIG. 11 is an isometric perspective view illustrating the fabrication of the second ply layer.

Next, the second ply layer of resin impregnated yarns is applied by steep helical winding. This is shown in FIG. 11.

In this design, the hoops or circumferential fibers of the second ply layer carry substantially the entire pressure load and therefore a greater number of circumferential fibers or hoops are needed for adequate strength. In the preferred embodiment, the ratio of circumferential fibers (hoops) to longitudinal or axial fibers (gores) is 2:1.

Figure 12:
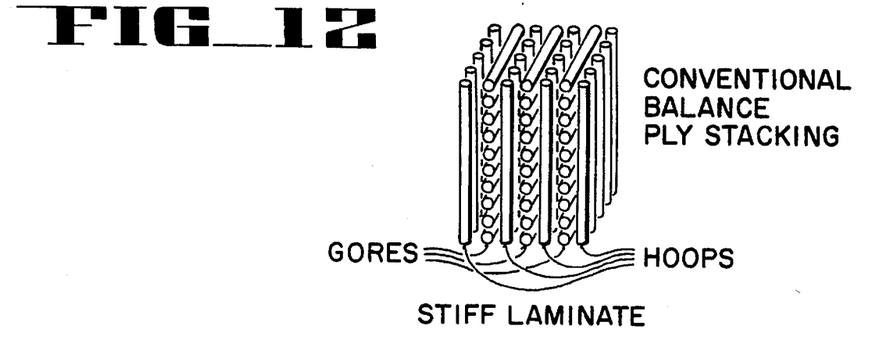
FIG. 12 is an enlarged fragmentary section view of a conventional balanced ply filament wound laminate typical of prior art inflatable nose fairing designs which are constructed as fiber-reinforced membranes.

FIG. 12 illustrates a conventional balanced ply filament wound laminate such as in used in the prior art inflatable nose fairing design. Balance ply laminates are known to be stiff and therefore are not easily bendable into tight radius curves since the fibers are distributed throughout the cross section and away from the neutral axis.

Figure 13:
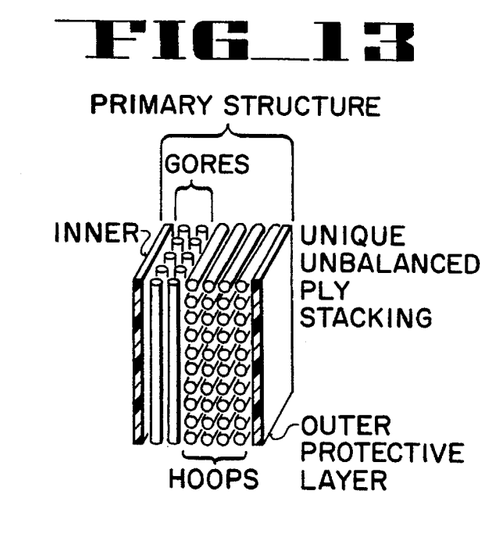
FIG. 13 is an enlarged fragmentary section view taken at the region indicated by the circular double arrow 13—13 of FIG. 7 illustrating one embodiment of the unbalanced ply filament wound laminate of the present invention shown in combination with a rubber-based protective outer layer.

FIG. 13 illustrates the unbalanced ply filament wound laminate of the present invention. The unbalanced laminate comprises a primary structure which includes the inner elastomeric layer or pressure membrane, the first ply layer made up of the longitudinally oriented fibers or "gores" and the second ply layer made up of circumferential fibers or "hoops".

A final fabrication step involves application of an additional outer layer to the hoops to protect the primary structure against material degradation due to thermal extremes and erosion caused by debris, sand, ice and other like particles which may be encountered during a missile flight. In one embodiment, this outer protective layer comprises a rubber-based composition which will form a hard char when subjected to elevated temperatures.

Figure 13A:
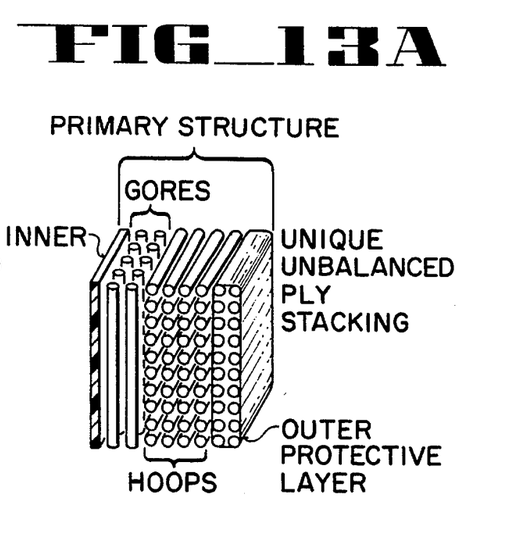
FIG. 13A is an enlarged fragmentary section view similar to FIG. 13 illustrating the unbalanced ply filament wound laminate of the present invention shown in combination with an outer protective layer composed of additional hoop wound resin impregnated yarns.

FIG. 13A shows an alternate embodiment wherein the outer protective layer is made up of additional circumferentially wound yarns. These additional yarns, referred to as "sacrificial plies", will tend to gradually degrade over time by flaking or peeling when subjected to erosion causing elements. The thickness of the sacrificial ply layer is selected per specific application and environmental conditions.

Once the protective outer layer is applied, the finished structure is allowed to cure. In one embodiment, the finished structure is cured in the as formed condition such that the fibers are not in strain when the nose fairing is inflated into the deployed position. In another embodiment, the completed structure is first folded into the stowed position and then allowed to cure such that the fibers are not in strain when the nose fairing is in the stowed position. A benefit of curing after folding is that the nose fairing can now be stowed for long periods of time (years) in its natural cured state with a minimum of fiber strain.

Figure 13B:
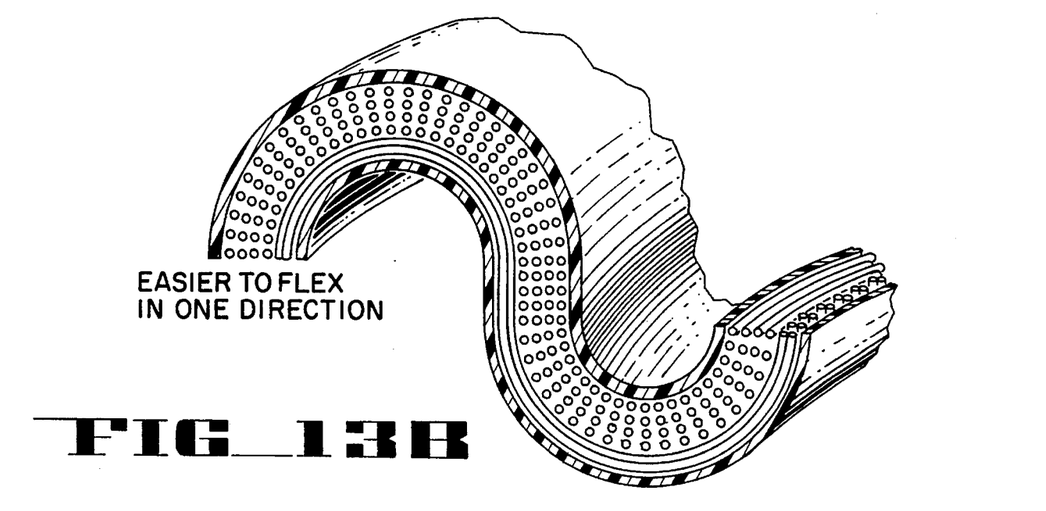
FIG. 13B is an enlarged fragmentary isometric view in partial section illustrating the flexibility of the unbalanced ply filament wound laminate in the axial direction (i.e. in the lengthwise direction of the gore fibers).

As illustrated in FIG. 13B, the unbalanced laminate easily bends in the axial direction, i.e. in the direction of the longitudinal fibers or gores. The reason for this is best understood with reference to normal bending stress analysis of a beam. It is well known that elements of a beam coincident with the neutral plane (i.e. the plane which contains the neutral axes of all cross sections of the beam) have zero strain. Also, the strain or resistance to bending of a "fiber" increases as its location is moved a further distance away from the neutral axis. In the present invention, the axial or longitudinal fibers of the unbalanced laminate are concentrated near the neutral axis of a cross section taken through the axial or longitudinal direction of the filament wound laminate thus making it easier to bend the unbalanced laminate in the longitudinal direction.

The unbalanced ply stacking allows the completed structure to be compactly folded into a shallow stowed position as shown in FIG. 8. A related benefit of the unbalanced ply stacking is that there are fewer filament winding steps involved so that less elastomeric material is required therefore further enhancing flexibility. This makes it possible to use higher temperature rated silicone rubber compositions (for higher thermal applications) which otherwise tend to be less flexible.

Figure 14:
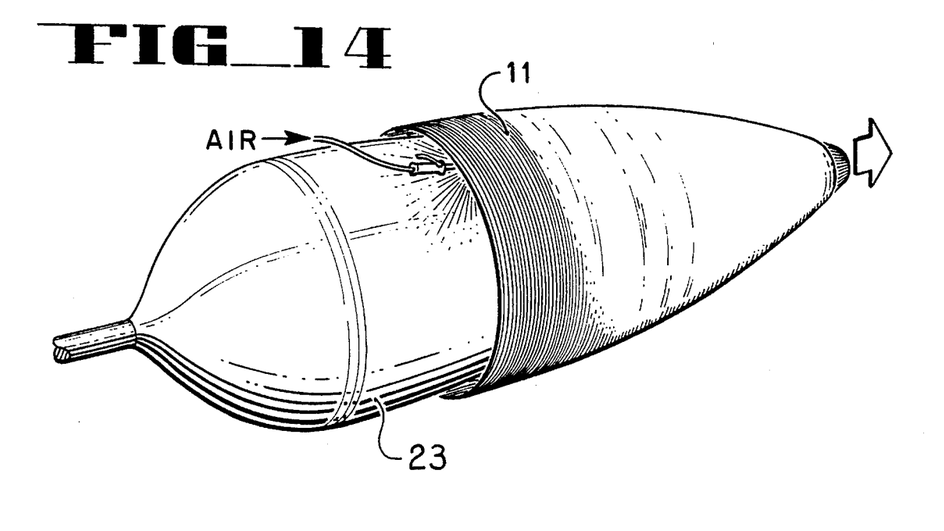
FIG. 14 is a isometric perspective view illustrating a technique for removing a fiber-reinforced membrane from a generally conical shaped mandrel on which it has been formed.

FIG. 14 illustrates one way for removing the completed structure from the mandrel 23 by using compressed air to break the adhesion bond therebetween.

Figure 15:
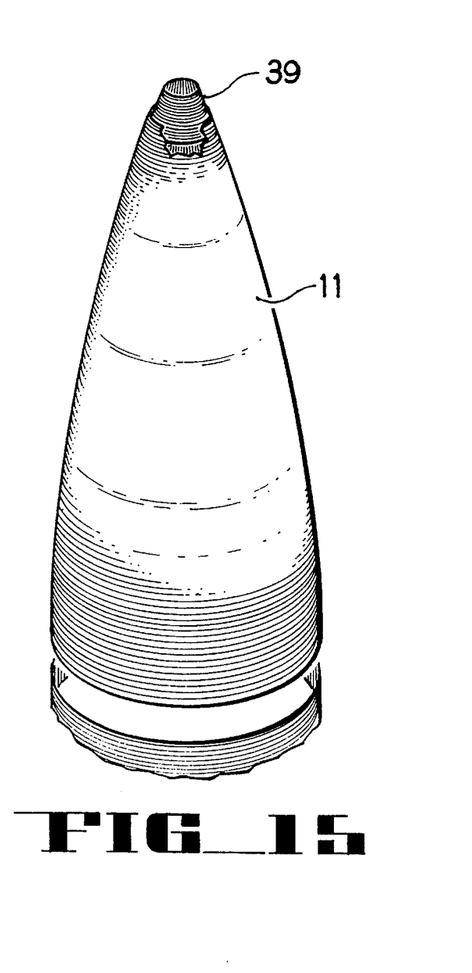
FIG. 15–16 illustrate the finish work involved in attaching a rigid nose tip to the completed primary structure.
Figure 16:
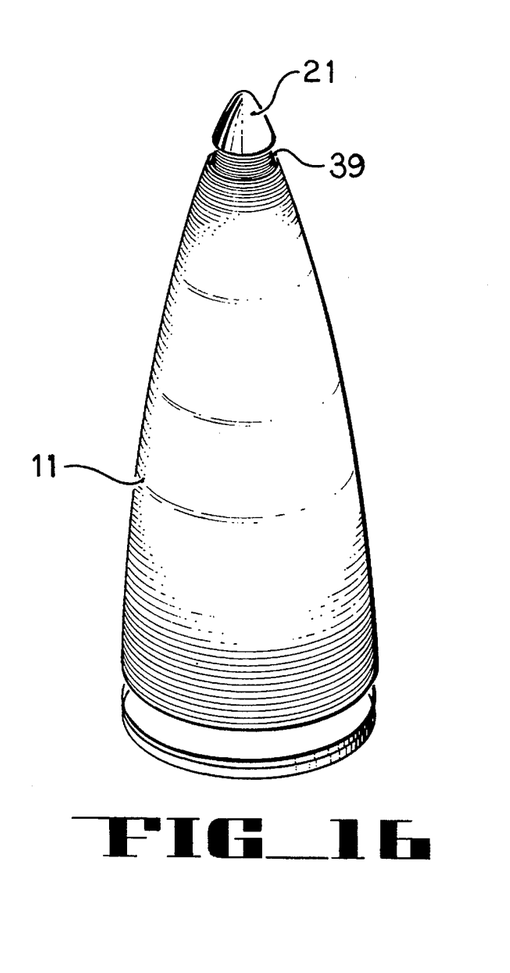

FIGS. 15–16 illustrate one way of securing the nose tip 21 to the nose fairing 11. In this case the nose tip 21 is fashioned as a rigid shell member. In order to provide sufficient surface area for bonding the nose tip 21 to the top of the nose fairing 11, a resin impregnated filament wound inner nose tip portion 39 is first formed and bonded to the interior of nose fairing 11. This is shown in FIG. 15. Next, the shell-like nose tip 21 is fitted over and bonded to the inner nose tip portion 39 and outer nose fairing 11. Elastomeric material and/or additional resin impregnated yarns may be applied by filament winding to provide a desired smooth transition at the junction between the nose tip 21 and the nose fairing 11.

Figure 16A:
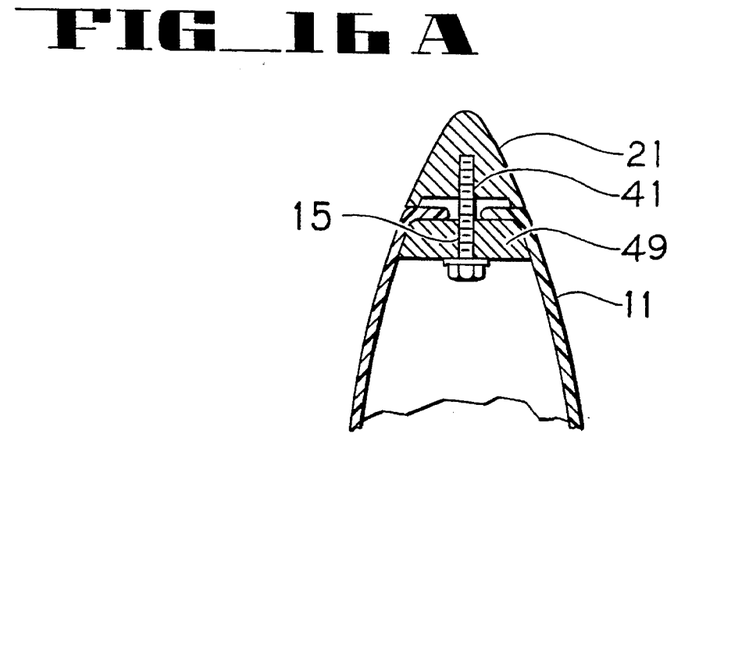
FIG. 16A is an enlarged fragmentary cross section view showing the detail of another connection scheme for securing a rigid nose tip to the inflatable nose fairing.

FIG. 16A shows an alternate embodiment for securing the nose tip 21 to the nose fairing 11. In this case the nose tip 21 is fashioned of a solid conical piece and is provided with a threaded axial bore 41. A wedge shaped lock member 43 is fitted within the conical end of the nose fairing 11. The assembly is anchored in place by a screw 45 which, upon tightening, draws the nose piece 21 and lock member 43 together about the top circular opening of the nose fairing 11.

Figures 16B, 16C:
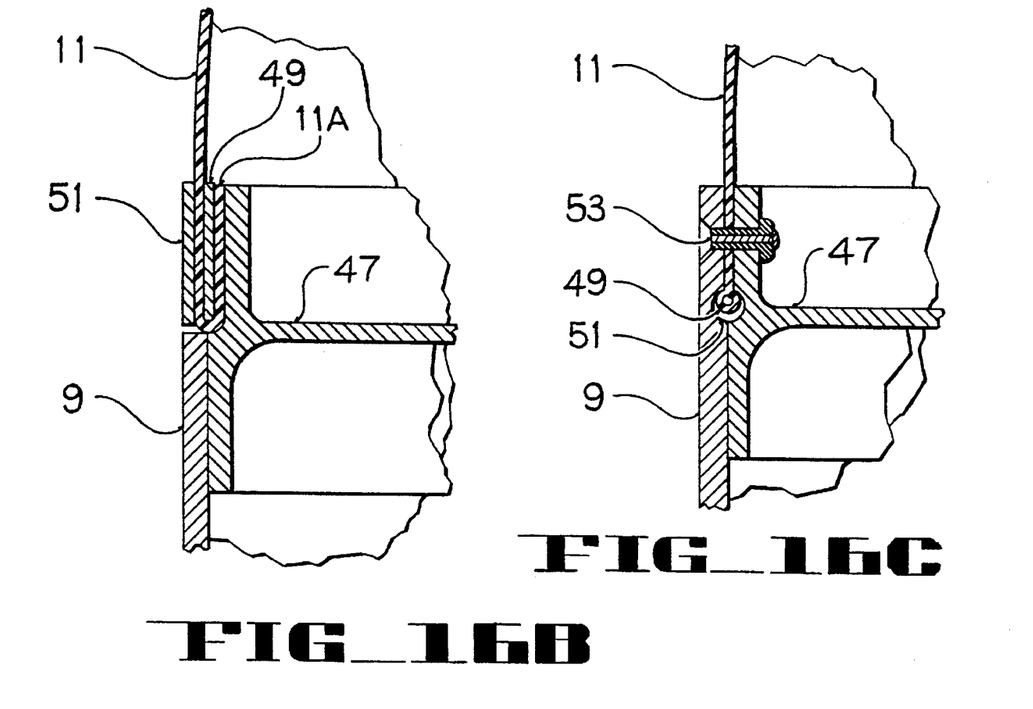
FIG. 16B is an enlarged fragmentary cross section view showing the detail of one connection assembly for securing the inflatable nose fairing to the forward end of the missile body.
FIG. 16C is an enlarged fragmentary cross section view similar to FIG. 16B showing the detail of another connection assembly for securing the inflatable nose fairing to the forward end of the missile body.
Figure 17:
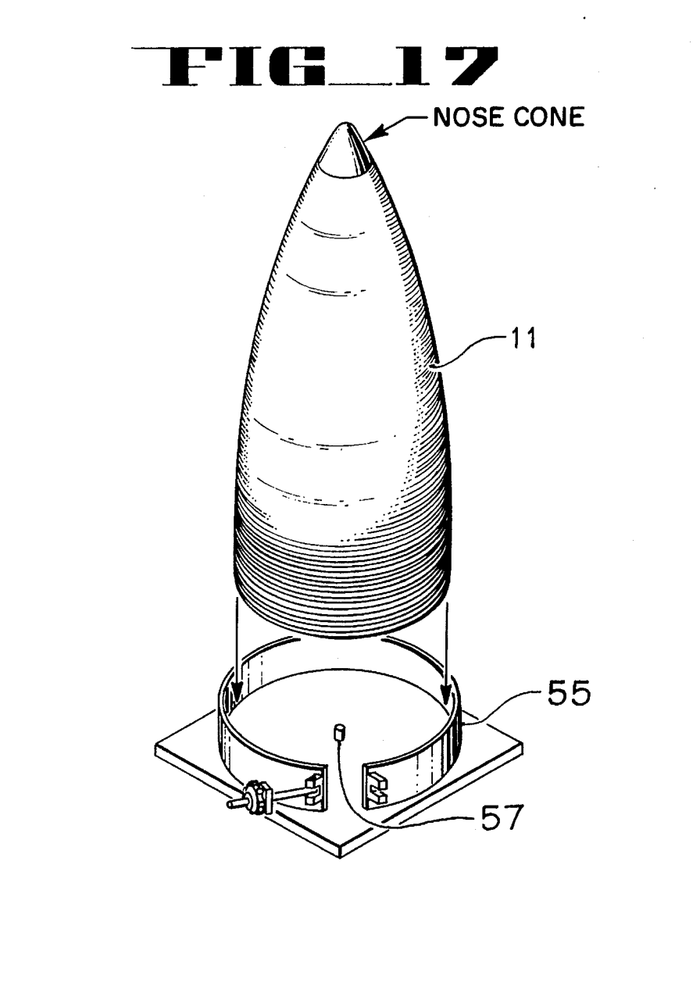
FIGS. 17–23 is a series of drawing views in isometric perspective which illustrate the method steps and apparatus used for folding the inflatable nose fairing along concentric folds such that it will fit within a shallow, substantially planar disk-shaped volume for compact stowage at a forward end of a length-constrained missile body.
Figure 18:
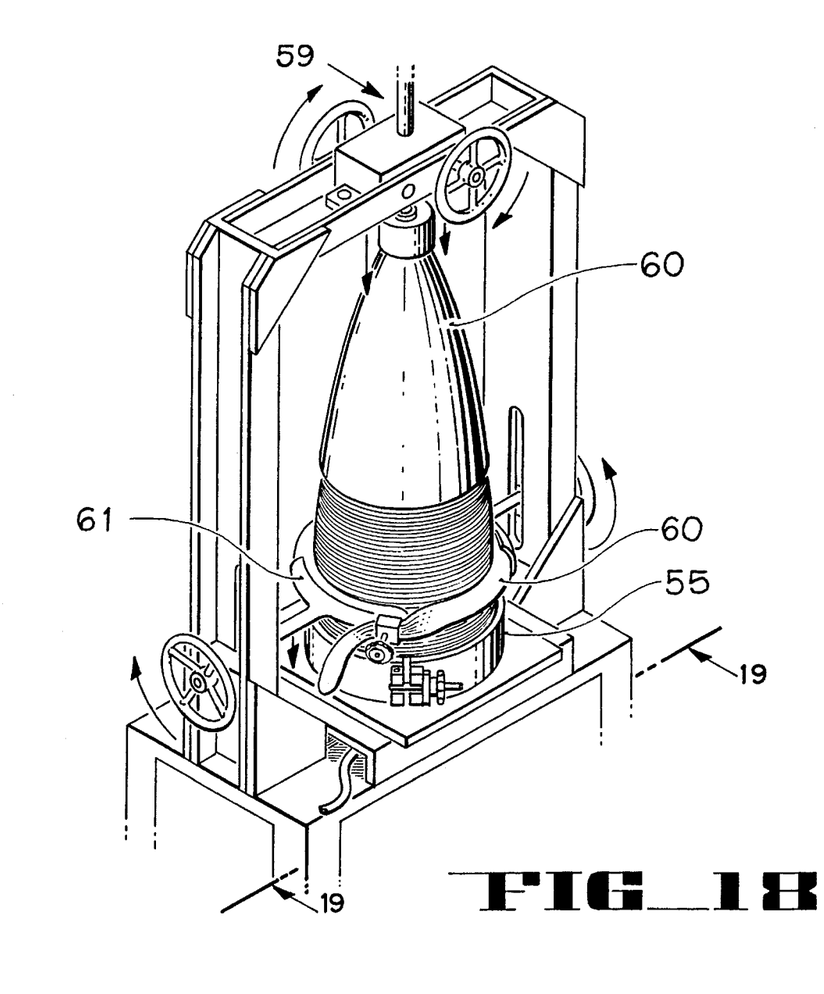

FIG. 16B shows one embodiment of a joint attachment for securing the nose fairing 11 to the flat nose end of missile 9 in an air tight manner. In this embodiment, the bottom edge of the nose fairing 11 is doubled back inwardly to provide a inboard flap portion 11a. The inboard flap portion is sandwiched between a pressure bulkhead 47 and an inboard skin retention band 49. An outboard skin retention band 51 holds the bottom edge of the nose fairing 11 tight against the inboard skin retention band 49.

FIG. 16C shows a second embodiment of an air tight joint attachment. In this embodiment, the top edge of the missile 9 extends upwardly such that it is roughly even with the top edge of the pressure bulkhead 47. A circumferential cord 49, being enveloped within bottom perimeter edge of the nose fairing 11, is receivingly engaged within a perimeter groove 51 formed at the junction between the inner surface of the missile skin and the pressure bulkhead 47. One or more recessed head screw fasteners 53 are used to hold the joint attachment together.

FIGS. 17–23 illustrate an apparatus for compactly folding the nose fairing 11 into the stowed position. The preferred apparatus includes: a fixed clamp 55 for holding the wide circular bottom end of the nose fairing 11 over a vacuum source 57; a plunger assembly 59 for exerting downward pressure onto the nose cone; and an adjustable perimeter clamp assembly 61 for exerting inwardly directed side pressure about the perimeter of the nose fairing 11. The plunger assembly 59 includes a conical holder 60 sized to fit over the nose fairing 11 for distributing the downwardly directed load over a wider surface area. The adjustable perimeter clamp assembly 61 includes a circumferential air bladder or inner tube 62 for providing an even distribution of inwardly directed side pressure.

Figure 19:
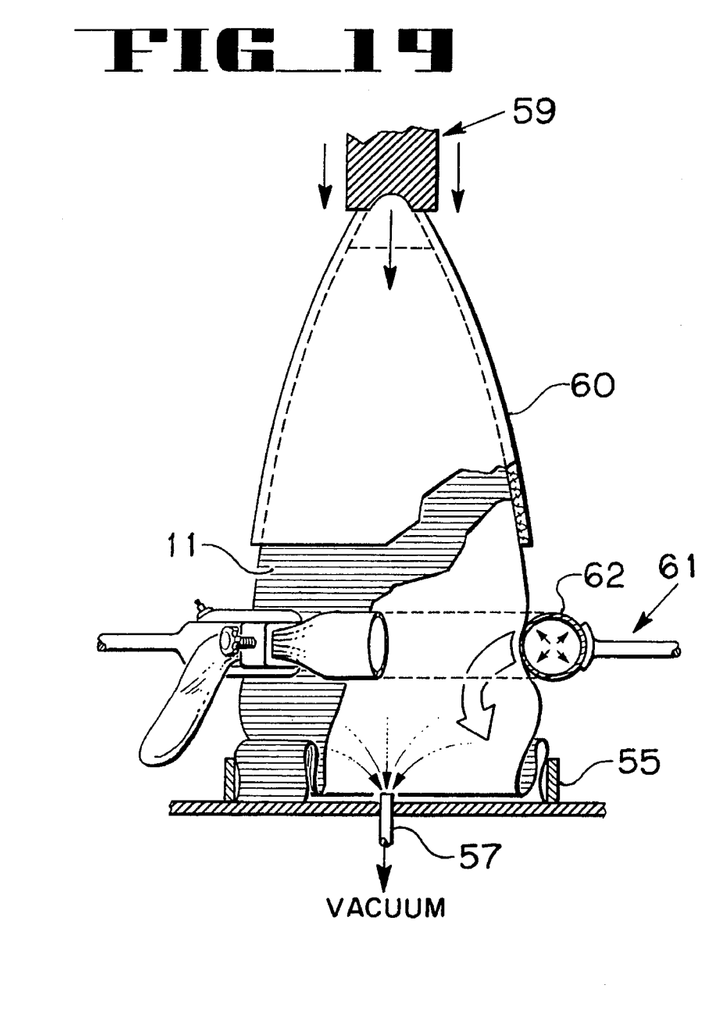
Figure 20:
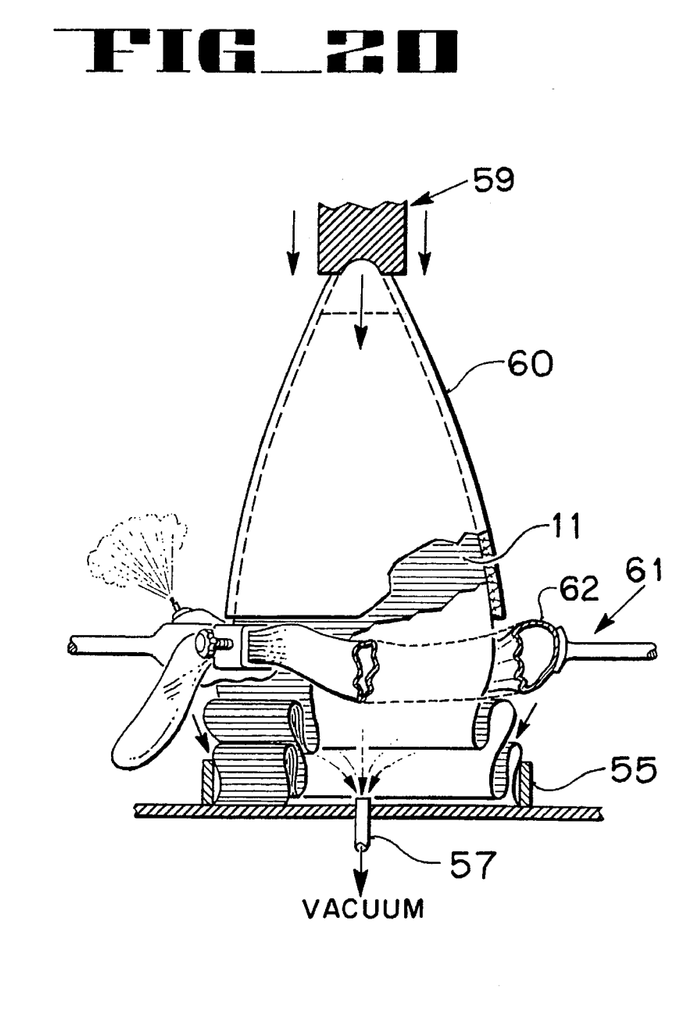
Figure 21:
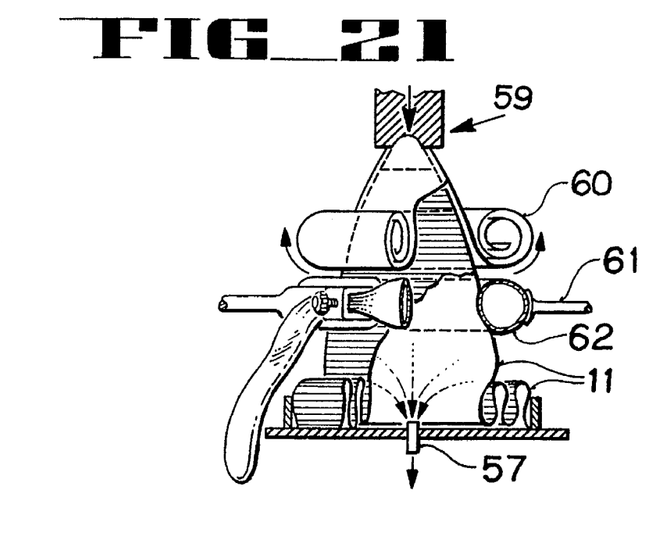
Figure 22:
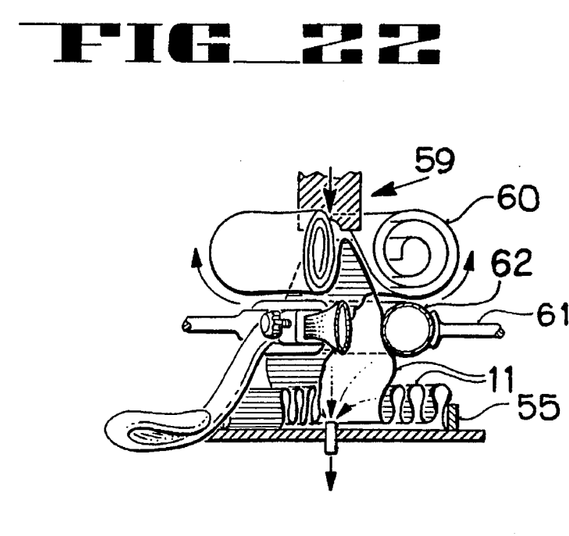
Figure 23:
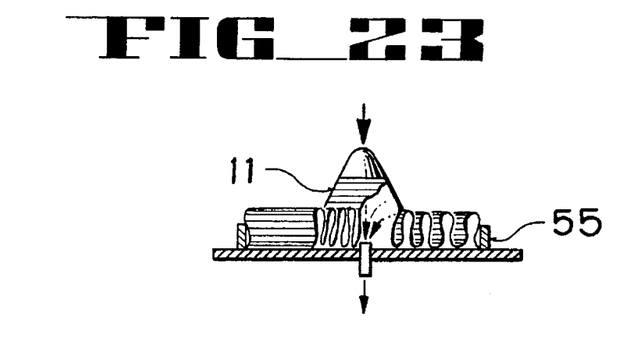

In operation, downward pressure is exerted on the nose fairing 11 by the plunger 59 and holder 60. At the same time, radially inward side pressure is exerted on the nose fairing at a location just above the bottom clamp 55 by the adjustable perimeter clamp assembly 61 and pressurized inner tube 62. Air pressure within the nose fairing 11 is withdrawn by vacuum 57. This causes the bottom edge of the nose fairing 11 to fold inwardly and downwardly as indicated in FIG. 19. The air pressure within the inner tube 62 is then released thereby allowing the nose fairing 11 to resume is normal shape after which the inner tube 62 is repressurized and the above steps are repeated (see FIGS. 20–23) until the nose fairing 11 is concentrically folded into the stowed position (see FIG. 8).

While we have illustrated and described the preferred embodiments of our invention, it is to be understood that these embodiments are capable of variation and modification, and we therefore do not wish to be limited to the precise details set forth, but desire to avail ourselves of such changes and alterations as fall within the purview of the following claims.

We claim:

1. An apparatus for use as an inflatable aerodynamic nose fairing for a length-constrained, canister launch missile having an elongated cylindrical shape with a uniformly wide circular cross section from rearward end to forward end, the apparatus comprising:
  a) a primary structure comprising a filament-reinforced flexible membrane attached to the forward end of the missile and inflatable from a first stowed position to a second deployed position, said primary structure when in said stowed position is compactly folded in an axial direction of the missile to form closely spaced concentric folds to fit within a shallow planar disc-shaped volume of reduced height atop the forward ends of the missile thereby permitting the missile to be lengthened and the usable payload capacity of the missile to be expanded to its full wide circular cylindrical shape, said primary structure when in said deployed position is extended forwardly to form an aerodynamic shape for reduced drag and improve range and performance; and wherein the primary structure comprises:
     i) an inner layer of elastomeric material forming a gaseous pressure membrane;
     ii) a first ply layer of resin impregnated yarns overlying said inner layer, said first ply layer having fibers arranged in a single direction and oriented substantially in the axial direction of the missile;
     iii) a second ply layer of circumferentially wound resin impregnated yarns overlying said first ply layer, said second ply layer having fibers arranged substantially transverse to the fibers of said first ply layer;
     iv) said second ply layer having a thickness approximately twice as great as said first ply layer such that said inner layer, said first ply layer and said second ply layer define a laminate wherein the axially oriented fibers of said first ply layer are concentrated near a neutral axis of a cross section through an axial direction of said laminate thereby facilitating the compact concentric folding of the primary structure into the stowed position; and
  b) means for rapidly inflating said primary structure into said deployed position upon broach of the missile canister.

2. The apparatus according to claim 1 which further includes an outer layer of flexible material for thermal and erosion protection.

3. The apparatus according to claim 2 wherein said outer layer comprises an additional layer of circumferentially wound resin impregnated yarns to provide a sacrificial ply layer, said sacrificial ply layer having a thickness sufficient to withstand erosion completely therethrough for a duration of a particular application.

4. The apparatus according to claim 2 wherein said outer layer comprises a rubber-based material which forms a hard char at elevated temperatures during flight.

5. The apparatus according to claim 1 wherein said inflation means comprises a pressurized gas system.

6. The apparatus according to claim 2 wherein said inflation means comprises a pressurized gas system.

7. The apparatus according to claim 1 which further includes means for simultaneously deploying mass forwardly within said inflatable nose fairing when inflated into the deployed aerodynamic position.

8. The apparatus according to claim 2 which further includes means for simultaneously deploying mass forwardly within said inflatable nose fairing when inflated into the deployed aerodynamic position.

* * * * *